United States Patent Office 3,202,052
Patented Aug. 24, 1965

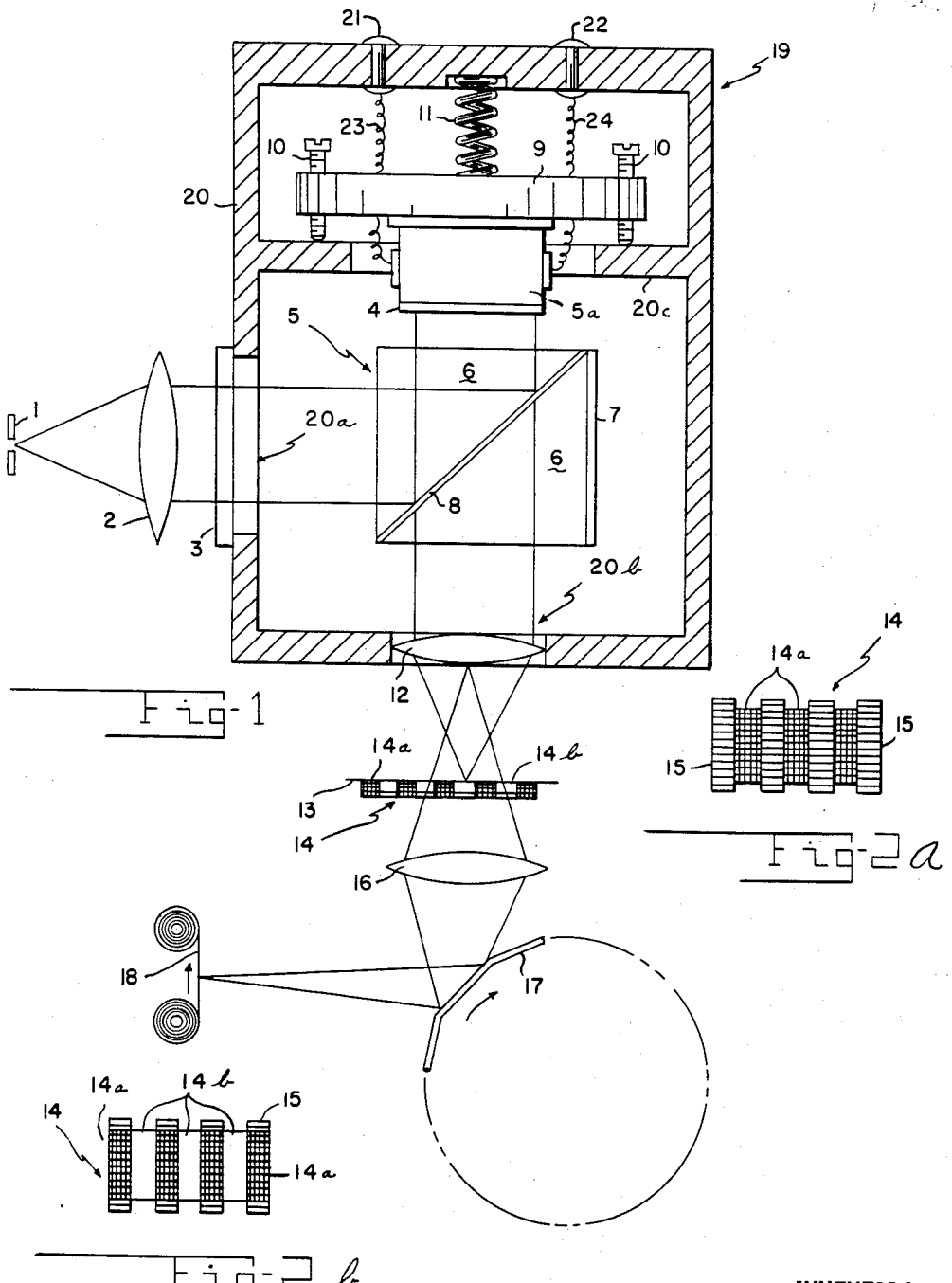

3,202,052
INTERFEROMETER USED WITH PIEZOELECTRIC CRYSTAL TO FORM LIGHT VALVE
Werner R. Rambauske and Hermann R. Mestwerdt, Dayton, Ohio, assignors to the United States of America as represented by the Secretary of the Air Force
Filed Jan. 12, 1962, Ser. No. 165,969
1 Claim. (Cl. 88—61)
(Granted under Title 35, U.S. Code (1952), sec. 266)

The invention described herein may be manufactured and used by or for the United States Government for governmental purposes without payment to us of any royalty thereon.

This invention relates generally to optical communication systems and, more particularly, to a highly efficient optical valve utilized in such systems for controlling increased intensity light sources.

The cathode ray tube normally used as a flying spot scanner or controllable light source for the relay and printing of electrically transmitted information is limited to reduced light intensities and resolving power resulting, for example, from inherent limitations in the fluorescent screen utilized therewith and, accordingly, requires the use of fast films of objectionable graininess when it is desired to print such electrically transmitted information. The optical valve of the present invention was developed to insure the use of fine grain films of low sensitivity in order to considerably enhance the resolution of printed information, as for example that received from radar signals.

It is an object of the present invention, therefore, to provide an improved optical valve adapted for combination with a mechanical scanning device to enable use of relatively fine grain films of low sensitivity and thus enhance the resolution of pictorial displays printed from information received from electrical signals.

A further object of the invention resides in the use of an improved and unique optical valve for controlling light sources of unlimited intensity.

A still further object of the invention utilizes a new and novel optical valve using interferometric means controllable by an electrical signal to produce a fringe pattern exactly matched by said optical valve to effect transmission or obstruction of the light beam.

Other objects and advantages of the invention will become apparent from the following description, in which;

FIG. 1 is a top view, partly diagrammatic in form, of the improved optical valve of the invention.

FIGS. 2a and 2b respectively represent in schematic form the light-obstructing and light-transmitting or open and closed positions of the grid element of the invention as the dark fringes produced in the improved optical valve of FIG. 1 are shifted.

In the phenomenon known as the interference of light, two interfering coherent light beams of the same wave length effect cancellation of each other (referred to as destructive interference) where a mutual phase difference of one half wave length exists therebetween. If no such mutual phase difference exists, said two coherent beams of light will combine their intensities (referred to as constructive interference). It is obvious, therefore, that values of phase difference between zero and one half produce the effect of either partial combination or cancellation. It is noted that this effect occurs without any consumption of additional energy. Since the latter effect is utilized in the instant invention, light beams of unlimited intensity may be controlled from full transmission to complete extinction by means of the inventive optical valve as will be described hereinafter in more detail.

The improved optical valve of the present invention consists in part of an interferometer. In one type of interferometer, namely, the Michelson or Twyman-Green type, the manner of adjustment thereof is such that the entire field of view is dark for a destructive interference position and bright for a constructive interference position when said interferometer is illuminated by monochromatic coherent light. Thus, any shift in this type of interferometer from the destructive interference position to the constructive interference position by one half wave length difference in the optical path results in a change in intensity of the light emerging from the interferometer, for instance, through a circular aperture from zero to 100%, neglecting losses by refraction, absorption and diffusion. Such emerging rays then pass through a lens which produces an image of the source, the brightness of which image being changed in proportion or in accordance with the change in optical pathlength. The actual amount of required shift in interferometer position to achieve the above-described results is relatively small. For example, when light of 5000 Angstrom wave length is employed, the required shift is $\frac{1}{4}(5 \times 10^{-4})$ mm. or equal to 0.000125 mm. In the instant invention, this minute change in the optical pathlength is actually accomplished by a corresponding displacement of a mirror in the interferometer which mirror is formed on one surface of a piezoelectrical crystal subject to contraction on application of an outside electrical signal thereto. Said mirror may be formed directly on one surface of the crystal or it may constitute a separate mirror of very small mass coupled to the crystal. In any event, since the inertial mass which has to be moved is either negligible or extremely small and the required displacement thereof very minute, the maximum useful frequency of the outside electrical signal controlling said crystal is very high and, in fact, is limited only by the piezoelectrical maximum frequency itself.

When the interferometer of the type described above is subjected to the described adjustment, it becomes extremely sensitive to optical irregularities and the light emerging therefrom fails to exhibit any sharp contrast as a result of interference from disturbing stray light and, accordingly, such an interferometer can be adjusted so that relatively broad fringes (both bright and dark) appear in the image plane of the lens which lens has been focused to the localized interference plane. Said bright and dark fringes, being of the straight parallel type, for example, will effect an exchange of places if the optical path difference is changed by one half wave length. In the present inventive system, a grid having opaque and transmissive bands exactly matching the fringe pattern is mounted in the above-mentioned lens image plane to effect a penetration or obstruction of the light in proportion to the lateral fringe shift in the plane of the grid. Of course, intermediate positions of the fringe shift results in modulation of the light intensity emerging from the grid and, since the intensity in the fringes of a Michelson-type interferometer changes from maximum brightness to maximum darkness as a $\cos^2$ function, the width of the transmissive zones of the grid must be relatively small, to obtain the optimum shut-off effect. In other words, in the "open" position of the interferometer, a part only of the available energy can be transmitted and, hence, it is advantageous to employ many fringes in accordance with the subject invention which may be obtained by proper adjustment of the interferometer. Additionally, a grid having a density distribution matching the intensity distribution in the fringe pattern is employed in such a manner that the optimum effect for a specific application of the light modulator is achieved. Thus, the light emerging from the grid may be collected and focused by a lens sharply to a spot whose brightness is modulated in accordance with the amplitude of the outside electrical signal received by the interferometer.

Another type of interferometer may be utilized where abundant light energy is being emitted from the source. This type, known as the Fabry-Perot interferometer, may be employed with the invention to attain the desired effects. In this event, the partially silvered surfaces producing the interference of light by multiple reflection are directly deposited on one surface of one or two piezoelectrical crystals which have to be made transmissive to light to simply produce a fringe pattern from an extended monochromatic and coherent light source. Said fringe pattern consists of circular fringes formed in the image plane of a lens which collects the rays from the output side of the interferometer. In this latter event, the grid located in the same image plane, likewise, must consist of circular opaque and transmissive rings with radii corresponding to the radii of the fringes. Although the light transmissivity of the latter-type interferometer is less than that previously described, its fringe contrast is much greater to permit sharp transitions from closed to open positions and also effect a nearly complete shut-off effect.

Referring now to the drawings and particularly FIG. 1, a preferred embodiment of the invention is indicated generally at 19 as including a main receptacle at 20 having windows for light entrance and emergence as indicated respectively at 20a and 20b. An interferometer, to be described hereinafter in detail, is indicated generally at 5 as housed within said receptacle 20. A light source of relatively high intensity is illustrated at 1 and a convex lens at 2 is utilized for collimating the beam of light from source 1, which collimated light illuminates the interferometer 5 within receptacle 20 through a spectral filter shown at 3 which filter 3 is positioned exteriorly of receptacle 20 in adjacent and contacting, sealing relation to light entrance window 20a. Said interferometer comprises a mirror 4, which mirror 4 may be evaporated on one side of the piezoelectrical crystal 5a, and the beamsplitting transparent cube element 6. Said beamsplitting transparent cube element 6 incorporates a fully silvered side at 7 and a diagonally cut side at 8. The latter side has been diagonally cut relative to the optical axis and then half-silvered and recemented. First-named side 7 represents one leg of the interferometer, while the mirror 4 on piezoelectrical crystal 5a represents the other leg thereof. Piezoelectrical crystal 5a may be quartz, ADP (ammoniumdihydrogenphosphate), or bariumtitanate and, further, could be replaced by a magnetostrictive vibrator element or an appropriate vibrating material as ferrite without departing from the true spirit or scope of the invention. In any event, the aforesaid piezoelectrical crystal 5a may be glued by conventional methods to the support plate at 9, which support plate 9 is adjustably mounted (as shown in FIG. 1) within the interior of the receptacle 20 by means of the adjustment screws at 10, which screws 10 are adjustably positioned on the upper surface of inwardly extending, inner flange portion 20c, to position mirror 4 in close proximity to beamsplitting cube element 6. A spring at 11 is utilized in compressed relation between the upper, inner surface of receptacle 20 and the top surface of support plate 9 to always maintain said support plate 9 and the piezoelectrical crystal 5a glued or cemented thereto in the selected adjusted position. In connection with the latter position, it is noted that, for the correct interferometer adjustment, the optical pathlengths between the half-silvered side 8 of the cube element 6 and the mirror 4 and between the half-silvered side 8 and the fully silvered side 7 must be equal. Thus, once the above-described equal condition of optical pathlengths is established by initial interferometer adjustment and a slight deviation of support plate 9 and hence of mirror 4 from the exact position parallel to the virtual image of the mirror formed by the fully silvered side 7 of beamsplitting cube 6 is introduced through appropriate adjustment of the screws 10, a series of alternate dark and bright fringes will appear in the plane of the aforesaid mirror 4. Said fringes may then be projected by a lens located at 12 in the light emergence window 20b of receptacle 20 into a plane positioned at 13 exterior to beam-splitting cube element 6 and the receptacle 20.

A grid or diaphragm having alternate opaque and transmissive zones is positioned as schematically shown in general at 14 in the above-described plane at 13. As seen more clearly in FIGS. 2a and 2b of the drawings, grid or diaphragm 14 includes a plurality of opaque bar portions 14a which are alternately spaced with the open grid portions at 14b (note FIG. 2b) and are arranged in precise matching relation relative to the fringe pattern focused on the aforesaid plane 13 as illustrated in FIG. 2b. Thus, opaque bar portions 14a are shown in precise alignment in the alternately arranged open spaces spaces between the dark fringes 15 which, of course, represent the bright fringes of the fringe pattern focused therein. Said dark fringes 15 are depicted somewhat greater in length than the bar portions 14a for the sake of clarity only. The grid or diaphragm 14 is also depicted in schematic form only since the specific nature of which (other than the alternate arrangement of its areas of transmission and opacity) is unimportant to the present invention. Further, dark fringes 15 are of the same dimensions as are bar portions 14a. In FIG. 2a, therefore, a plurality (four in the instant case) of dark fringes 15 are illustrated for purposes of clarity; however, the exact number may vary without departing from the true spirit or scope of the invention. Since, in the view of FIG. 2a, dark fringes 15 are positioned in the alternately disposed spaces between adjacently arranged opaque bars 14a, which spaces represent the bright fringes of the fringe pattern, to thereby act as a light modulator in the closed condition or state of the inventive optical valve, any emergence of light therefrom is prohibited or obstructed. However, if piezoelectrical cyrstal 5a is caused to contract through application of an outside electrical signal thereto which signal might represent a demodulated radar signal received and applied to crystal 5a by means of terminals 21, 22 and leads 23, 24, the previously-mentioned mirror 4 formed on the face of said crystal 5a will, of course, move simultaneously with such crystal contraction in a direction away from its initial position of adjustment to thereby change the optical pathlength between said mirror 4 and the half-silvered side 8 of beamsplitting cube element 6. Should the latter change in optical pathlength correspond to precisely one half of the wave length of the light utilized, the previously-described dark fringes 15 will also suffer a lateral shift from the closed position of FIG. 2a a distance equal to one fringe width to the open position illustrated in FIG. 2b wherein fringes 15 are in direct alignment with the opaque bars 14a of grid or diaphragm 14. This latter movement thereby permits penetration or emergence of the bright fringes through the now-clear or unobstructed areas of grid or diaphragm 14. Thus, this second position of grid or diaphragm 14 constitutes the open position of the inventive optical valve.

It is seen that the above-described improved optical valve may be utilized, if desired, in combination with a third lens as schematically illustrated at 16 in FIG. 1 which lens 16 is positioned exteriorly of grid or diaphragm 14 for the purpose of collecting and focusing the fringes which have penetrated grid or diaphragm 14 onto the multi-sided mirror wheel shown at 17 in schematic and broken-away form only since its specific nature is unimportant to the present invention. The light from said fringes is naturally reflected by said mirror wheel 17 to produce a scanning motion on the film also illustrated in schematic form only at 18 which fiilm would be, of course, moving at an appropriate continuous speed to record the information benig received. The lens 16, mirror wheel 17 and the film 18 are all illustrated only for the purposes of indicating one application only of the inventive optical valve.

Thus, a new and improved optical valve has been developed wherein the control of radiation flux from a high intensity light source is facilitated. Moreover, the inventive optical valve consists of an interferometer controllable by an outside electrical signal (which may represent a demodulated radar signal, for example) and combined in unique manner with a grid or diaphragm element matching the fringe pattern produced by the interferometer, the fringe pattern shifting in accordance with the electrical signal received to effect the closed or open positions of said grid or diaphragm element.

We claim:

An improved optical valve comprising: in combination,
(a) a high intensity light source;
(b) a receptacle housing having light-entrance and -emergent windows;
(c) an interferometer within said receptacle housing for receiving a coherent beam of light from said source;
(d) a spectral filter between said interferometer and said light source, said filter being positioned adjacent to and exteriorly of said light-entrance window in sealing relation thereto;
(e) fixed convex collimating lens means between said spectral filter and said light source;
(f) said interferometer including a beam-splitting rectangular solid element having a diagonally cut half-silvered face at a preset fixed distance from the side thereof for initially dividing said beam into two optical paths of equal length when said interferometer is in initial adjustment, said rectangular solid element having a fully silvered face forming a mirror at the end of one of said two optical paths;
(g) a piezoelectric crystal having a mirror formed on one face thereof, at the end of the other of said two optical paths;
(h) means for applying an electrical signal to said crystal;
(i) means for adjustably positioning said piezoelectric crystal and the mirror attached thereto out of said initial adjustment to form light fringes comprising a main support plate within said receptacle housing for mounting said crystal thereto, and a pair of adjustment screws incorporated on said plate, and a spring element in operable engagement with said plate and said receptacle housing for adjustably positioning said support plate relative to said beam-splitting element to an initially fixed position;
(j) second convex lens means positioned within said light-emergent window for focusing the fringes in a predetermined plane exterior to said receptacle housing;
(k) and diaphragm pattern means having light transmitting and light obstructing portions disposed in adjacent, alternate relation to each other, and positioned in said predetermined plane to obstruct transmission of light therethrough of said fringes and subsequently transmit light therethrough in proportion to an outside electrical signal applied to said piezoelectric crystal to effect changes in the optical path length of said interferometer to shift said fringes to other lateral positions relative to said diaphragm pattern.

References Cited by the Examiner

UNITED STATES PATENTS

| 2,385,086 | 9/45 | D'Agostino et al. | 88—61 X |
| 2,455,763 | 12/48 | Harrison | 88—61 X |
| 2,557,974 | 6/51 | Kibler | 88—61 X |
| 3,035,492 | 5/62 | Blythe | 88—61 |

FOREIGN PATENTS

| 342,219 | 1/31 | Great Britain. |

OTHER REFERENCES

Brumley et al.: Journal of the Optical Society of America, vol. 40, No. 11, November 1950, p. 800 A40.

Langer: Journal of the Optical Society of America, vol. 16, No. 2, February 1928, pp. 134 to 136 relied on.

JEWELL H. PEDERSEN, *Primary Examiner.*